United States Patent
Yano et al.

(10) Patent No.: US 9,212,087 B2
(45) Date of Patent: Dec. 15, 2015

(54) GLASS-CERAMICS COMPOSITE MATERIAL

(71) Applicant: NGK Insulators, Ltd., Nagoya (JP)

(72) Inventors: Shinsuke Yano, Nagoya (JP); Yoshihiro Tanaka, Nagoya (JP); Naoto Ohira, Nagoya (JP); Hirofumi Yamaguchi, Komaki (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/203,657

(22) Filed: Mar. 11, 2014

(65) Prior Publication Data

US 2014/0296053 A1    Oct. 2, 2014

Related U.S. Application Data

(63) Continuation of application No. PCT/JP2013/066038, filed on Jun. 11, 2013.

(30) Foreign Application Priority Data

Mar. 26, 2013 (JP) ................. 2013-064780

(51) Int. Cl.
  C03C 14/00      (2006.01)
  C03C 3/091      (2006.01)

(52) U.S. Cl.
  CPC ............... C03C 14/00 (2013.01); C03C 3/091 (2013.01); *C03C 2214/20* (2013.01)

(58) Field of Classification Search
  CPC .................................................. C03C 14/004
  USPC ......................................................... 501/32
  See application file for complete search history.

(56) References Cited

U.S. PATENT DOCUMENTS

| | | | |
|---|---|---|---|
| 5,214,005 A | 5/1993 | Yamakawa et al. | |
| 6,579,818 B2* | 6/2003 | Kawai et al. | 501/32 |
| 6,630,417 B2* | 10/2003 | Kawai et al. | 501/16 |
| 7,906,444 B2* | 3/2011 | Liebald et al. | 501/9 |
| 2002/0039645 A1 | 4/2002 | Kawai et al. | |
| 2006/0128546 A1 | 6/2006 | Schluckwerder et al. | |
| 2007/0287012 A1 | 12/2007 | Kawai et al. | |
| 2014/0206522 A1* | 7/2014 | Yano et al. | 501/5 |

FOREIGN PATENT DOCUMENTS

| | | | |
|---|---|---|---|
| JP | 63-210043 A1 | 8/1988 | |
| JP | 02-221162 A1 | 9/1990 | |
| JP | 02-225339 A1 | 9/1990 | |
| JP | 04-017394 A1 | 1/1992 | |
| JP | 04-254477 A1 | 9/1992 | |
| JP | 06-016477 A1 | 1/1994 | |
| JP | 2001-342063 A1 | 12/2001 | |
| JP | 2002-053369 A1 | 2/2002 | |
| JP | 2002-348172 A1 | 12/2002 | |
| JP | 2003-073162 A1 | 3/2003 | |
| JP | 2003-137657 A1 | 5/2003 | |
| JP | 2005-533744 A1 | 11/2005 | |
| JP | 2008-270741 A1 | 11/2008 | |
| WO | 2013/015223 A1 | 1/2013 | |

OTHER PUBLICATIONS

International Search Report and Written Opinion dated Aug. 27, 2013.

Extended European Search Report (Application No. 13834381.9) dated Aug. 11, 2015.

* cited by examiner

*Primary Examiner* — Karl Group
(74) *Attorney, Agent, or Firm* — Burr & Brown, PLLC

(57) ABSTRACT

A glass-ceramics composite material suitable for a low-temperature firing use, which has high moisture resistance and thermal conductivity, is provided. In the glass-ceramics composite material which contains aluminum nitride (AlN) particles as a filler, even in a case where boron oxide ($B_2O_3$) is blended as a flux of a glass phase, by adjusting the composition of raw materials which forms the glass phase to a specific conditions to make the crystal phase which contains boron (B) precipitate at the time of firing of the glass-ceramics composite material.

7 Claims, No Drawings

GLASS-CERAMICS COMPOSITE MATERIAL

BACKGROUND OF THE INVENTION

1. Field of the Invention

The present invention relates to a glass-ceramics composite material. More particularly, the present invention relates to a glass-ceramics composite material which is suitable for the low-temperature firing use and has high moisture resistance and thermal conductivity.

2. Description of Related Art

For example, in the circuit substrate applied to a semiconductor package, a multi-layer circuit substrate, etc., suppression of the loss by reduction of the electrical resistance of the conductor which constitutes wiring and improvement of the heat resistance responding to increase of the heat generated from a semiconductor device has been an important subject. As a measure over the former, for example, metal which has low electrical resistance (good conductor), such as gold, silver, copper, and an alloy containing such metal is widely used. On the other hand, as a measure over the latter, a ceramic substrate using ceramics as a base material is widely used in place of a resin substrate using resin as a base material.

In such a ceramic substrate, as mentioned above, the conductor which constitutes a surface electrode and inner layer wiring comprises a good conductor, such as gold, silver, copper, and an alloy containing such metal, for example. Thereby, in such a ceramic substrate, for example, even when highly fine inner layer wiring is disposed for the purpose of improving the performance of a semiconductor package, etc., increase of the electrical resistance of wiring can be suppressed and the resistance loss in the semiconductor package which uses the ceramic substrate can be reduced.

By the way, the metal (low resistance metal) which has low electrical resistance, such as gold, silver, copper, and an alloy containing such metal, which is used for the purpose of suppressing increase of the electrical resistance of wiring as mentioned above, has a relatively low melting point as compared with other metal. When a sheet of dielectric material (base material consisting of dielectric layer(s)) in which a conductive pattern (wiring) comprising such a low resistance metal is embedded is simultaneously fired at a temperature higher than the melting point of the metal, there is a possibility that the metal may melt and it may become difficult to maintain the desired shape of the conductive pattern. Therefore, when such a low resistance conductor is used as a conductor which constitutes a surface electrode and inner layer wiring, it is desirable to use ceramics which can be fired at a temperature lower than the melting point of the low resistance conductor used.

In addition, it is desirable to use what is called low temperature fired substrate material (LTCC: Low Temperature Co-fired Ceramics) as the ceramic that can be fired at a temperature lower than the melting point of the low resistance conductor.

For example, a glass-ceramics composite material which has its firing temperature lowered by blending a glass component into ceramics is generally used as an LTCC. Even when gold, silver, copper, or an alloy containing such metal, is used as a low resistance conductor having a relatively low melting point the possibility that the metal may melt making it difficult to maintain the desired shape of the conductive pattern when being fired simultaneously together with the base material can be reduced by using such LTCC materials.

For example, in semiconductor elements, such as a power semiconductor element, as a loss remedy, silicon carbide (SiC) wafers and/or gallium nitride (GaN) wafers are being used widely in place of silicon (Si) wafers used conventionally. The power semiconductor elements which use these new types of wafer (for example, SiC-MOSFET, GaN-HEMT, etc.) have a feature that operation at a higher temperature is possible, as compared with the power semiconductor element which uses the conventional Si wafer. Thereby, the cooling mechanism indispensable in the power semiconductor element which uses the conventional Si wafer (for example, a heat sink, a water-cooled mechanism, etc.) can be simplified drastically. As a result, reduction in size and weight of the power module including the power semiconductor element can also be attained by using these new types of wafer.

However, the temperature in the surroundings of the power semiconductor element is higher than before due to the rise of the operating temperature and reduction in size and weight of a power module as well as the simplification of a cooling mechanism accompanying use of the new types of wafer as mentioned above. Therefore, there is an increasing demanded for a ceramic substrate used for a power semiconductor element to demonstrate not only even higher heat resistance, but also higher thermal conductivity than before.

In the art, in response to such a demand, for example, it has been proposed to add particles having high thermal conductivity, such as aluminum nitride (AlN) particles and silicon carbide (SiC) particles, etc. (high thermal conductive particles) as filler particles to the glass-ceramics composite material which constitutes the base material of the ceramic substrate which has the inner layer wiring consisting of low resistance metal (good conductor), such as gold, silver, copper, and an alloy containing such metal, for example (for example, refer to Patent Literatures 1 to 8).

Moreover, it has been proposed to blend spinel system compound crystal phases and such as gahnite ($ZnAl_2O_4$) and/or spinel ($MgAl_2O_4$), as well as at least one kind of non-oxide system compound crystal phase chosen from the group of aluminum nitride (AlN), silicon nitride ($Si_3N_4$), silicon carbide (SiC), and boron nitride (BN), into a glass phase comprising as a main component silicon oxide ($SiO_2$), aluminum oxide ($Al_2O_3$), zinc oxide (ZnO), magnesium oxide (MgO), and boron oxide ($B_2O_3$), for the purpose of raising the intensity and the thermal conductivity of a base material effectively (for example, refer to Patent Literature 9).

As mentioned above, in the art, various technology which raises the thermal conductivity of a glass-ceramics composite material by adding, for example, non-oxide system compound crystal phase, such as aluminum nitride (AlN) etc., as filler particles, to a glass-ceramics composite material has been proposed.

In the glass-ceramics composite material used as LTCC, for example, from a viewpoint of securing the properties required for LTCC, such as improvement in the workability at the time of dissolution of a glass phase, reduction of firing temperature, and improvement in the strength and thermal conductivity by increasing the degree of densification, etc., it is thought that it is important to lower the melting point and/or the softening point of a glass phase. In order to lower the melting point of a glass phase, it is effective to add a flux component, for example, such as boron oxide ($B_2O_3$), to a glass phase. However, a glass phase containing large quantity of boron oxide ($B_2O_3$) has poor moisture resistance, and concern remains about the reliability under high temperature and high humidity circumstance, for example, when it is used as a material of the substrate (electronic circuit card) on which an electronic circuit element is mounted, for example.

As mentioned above, in the art, demand for a glass-ceramics composite material suitable for a low-temperature firing use, which has high moisture resistance and thermal conductivity, has been existing.

CITATION LIST

Patent Literature

[PTL 1] Japanese Patent Application Laid-Open (kokai) No. H02-221162
[PTL 2] Japanese Patent Application Laid-Open (kokai) No. H04-254477
[PTL 3] Japanese Patent Application Laid-Open (kokai) No. H06-016477
[PTL 4] Japanese Patent Application Laid-Open (kokai) No. 2001-342063
[PTL 5] Japanese Patent Application Laid-Open (kokai) No. 2002-348172
[PTL 6] Japanese Patent Application Laid-Open (kokai) No. 2003-073162
[PTL 7] Japanese Patent Application Laid-Open (kokai) No. 2003-137657
[PTL 8] Japanese Patent Application Laid-Open (Translation of PCT Application) No. 2005-533744
[PTL 9] Japanese Patent Application Laid-Open (kokai) No. 2002-053369

SUMMARY OF THE INVENTION

As mentioned above, in the art, demand for a glass-ceramics composite material suitable for the low-temperature firing use, which has high moisture resistance and thermal conductivity, has been existing. The present invention has been accomplished in order to meet such a demand. More specifically, the present invention sets it as one purpose to provide a glass-ceramics composite material suitable for a low-temperature firing use, which has high moisture resistance and thermal conductivity.

Solution to Problem

The above-mentioned one purpose of the present invention can be attained by;
a glass-ceramics composite material obtained by firing,
a glass phase obtained from glass raw materials that comprise silicon oxide ($SiO_2$), aluminum oxide ($Al_2O_3$), magnesium oxide (MgO), and boron oxide ($B_2O_3$), and
a crystal phase that consists of aluminum nitride (AlN), wherein:
based on the total amount of said glass raw materials,
the composition ratio of silicon oxide ($SiO_2$) is 15 mass % or more and less than 60 mass %,
the composition ratio of aluminum oxide ($Al_2O_3$) is 12 mass % or more and less than 40 mass %,
the composition ratio of magnesium oxide (MgO) is 5 mass % or more and less than 12 mass %, and
the composition ratio of boron oxide ($B_2O_3$) is more than 0 mass % and 8 mass % or less.

Advantageous Effects of Invention

In accordance with the glass-ceramics composite material according to the present invention, a glass-ceramics composite material suitable for a low-temperature firing use, which has high moisture resistance and thermal conductivity, can be provided.

DETAILED DESCRIPTION OF THE INVENTION

As mentioned above, the present invention sets it as one purpose to provide a glass-ceramics composite material suitable for a low-temperature firing use, which has high moisture resistance and thermal conductivity.

As a result of wholehearted research for attaining the purpose, the present inventor has found that, In the glass-ceramics composite material which contains aluminum nitride (AlN) particles as a filler, even when boron oxide ($B_2O_3$) is blended as a flux of a glass phase, a decrease in moisture resistance due to boron oxide ($B_2O_3$) can be suppressed by adjusting the composition of raw materials which form the glass phase to a specific conditions to make a crystal phase containing boron (B) precipitate at the time of firing of the glass-ceramics composite material, and has conceived the present invention.

Namely, the first embodiment of the present invention is,
a glass-ceramics composite material obtained by firing,
a glass phase obtained from glass raw materials that comprise silicon oxide ($SiO_2$), aluminum oxide ($Al_2O_3$), magnesium oxide (MgO), and boron oxide ($B_2O_3$), and
a crystal phase that consists of aluminum nitride (AlN), wherein:
based on the total amount of said glass raw materials,
the composition ratio of silicon oxide ($SiO_2$) is 15 mass % or more and less than 60 mass %,
the composition ratio of aluminum oxide ($Al_2O_3$) is 12 mass % or more and less than 40 mass %,
the composition ratio of magnesium oxide (MgO) is 5 mass % or more and less than 12 mass %, and
the composition ratio of boron oxide ($B_2O_3$) is more than 0 mass % and 8 mass % or less.

As mentioned above, the glass-ceramics composite material according to the present embodiment is,
a glass-ceramics composite material obtained by firing,
a glass phase obtained from glass raw materials that comprise silicon oxide ($SiO_2$), aluminum oxide ($Al_2O_3$), magnesium oxide (MgO), and boron oxide ($B_2O_3$), and
a crystal phase that consists of aluminum nitride (AlN).

The glass raw materials may contain some other components (accessory components) besides the above-mentioned components (main components), unless it becomes the hindrance of achievement of the purpose of the present invention. For example, boron oxide ($B_2O_3$) contained in the above-mentioned main components is a "flux" added in order to adjust the melting behavior at the time of melting glass raw materials at high temperature in the process during which a glass phase is generated. Alkali metal oxides (for example, lithium oxide ($Li_2O$), sodium oxide ($Na_2O$), potassium oxide ($K_2O$), etc.) may be contained in such a flux besides boron oxide ($B_2O_3$). Moreover, the glass phase may contain a crystal nucleating agent (for example, zirconium oxide ($ZrO_2$), titanium oxide ($TiO_2$), platinum (Pt), and phosphorus pentoxide ($P_2O_5$) etc.) etc. which is added in order to promote crystallization of a glass phase, as an accessory component. Further, the glass raw materials may further contain zinc oxide (ZnO) besides the above-mentioned main components, unless it becomes the hindrance of achievement of the purpose of the present invention.

The glass phase can be obtained, for example, by melting various glass raw materials as mentioned above at a very high temperature (for example, 1200° C. or more) and rapidly cooling the resulting molten object by throwing it into water, etc., for example. On the other hand, the crystal phase, which is fired with the glass phase thus obtained to constitute the glass-ceramics composite material according to the present embodiment, consists of aluminum nitride (AlN) as mentioned above, and corresponds to non-oxide system compound crystal phase (filler particles) added for the purpose of improvement in thermal conductivity in the glass-ceramics composite material according to the above-mentioned conventional technology.

However, in the glass-ceramics composite material according to the present embodiment, the filler particles which consist of substances other than aluminum nitride (AlN) can be used in combination with the non-oxide system filler particles which consist of aluminum nitride (AlN). Such filler particles which consist of substances other than aluminum nitride (AlN) can be chosen, for example, from those known in the art as filler particles added for the purpose of improvement in thermal conductivity in the glass-ceramics composite material according to the above-mentioned conventional technology. Among them, for example, oxide system fillers, such as titanium oxide ($TiO_2$), zirconium oxide ($ZrO_2$), and spinel ($MgAl_2O_4$), and non-oxide system fillers, such as silicon carbide (SiC) and silicon nitride ($Si_3N_4$), have an effect on promoting and/or stabilizing the precipitation of a crystal phase from a glass phase. Especially silicon carbide (SiC) is suitable since it has a large effect on promoting and stabilizing the precipitation of a crystal phase from a glass phase.

Subsequently, the glass-ceramics composite material can be obtained, for example, by mixing the glass phase obtained as mentioned above and the crystal phase, for example, in powder state at a desired composition ratio, and firing the mixture at a predetermined temperature (for example, 700° C. to 1050° C.). In addition, although the firing processing is generally performed in an atmosphere in which inactive gas exists (for example, nitrogen atmosphere, etc.), for example, from a viewpoint of the prevention from deterioration of filler particles, the firing processing may be performed in an atmosphere in which oxygen exists (oxidative atmosphere) when an oxide film suitable as an oxidation resistant film is easily formed on the surface of filler particles.

By the way, in the glass-ceramics composite material according to the conventional technology, which is acquired by firing the glass phase obtained from the glass raw materials comprising the components as mentioned above and the crystal phase, when boron oxide ($B_2O_3$) is added to the glass phase as a flux, although the workability at the time of melting of the glass phase can be improved accompanying the decrease in the melting point of the glass phase, firing temperature can be lowered, and the strength and thermal conductivity can be improved by the rise of the degree of densification, there has been a possibility that the moisture resistance of the glass phase might fall and, for example, the reliability under the high temperature and high humidity circumstance of the substrate in which the glass-ceramics composite material is used as a base material might fall, as mentioned above.

However, as mentioned above, the present inventor has found that, in the glass-ceramics composite material which contains aluminum nitride (AlN) particles as a filler, even when boron oxide ($B_2O_3$) is blended as a flux of a glass phase, a decrease in moisture resistance due to boron oxide ($B_2O_3$) can be suppressed by adjusting the composition of raw materials which form the glass phase to a specific conditions to make a crystal phase containing boron (B) precipitate at the time of firing of the glass-ceramics composite material.

Specifically, based on the total amount of said glass raw materials which constitute the glass-ceramics composite material according to the present embodiment, the composition ratio of silicon oxide ($SiO_2$) is 15 mass % or more and less than 60 mass %, the composition ratio of aluminum oxide ($Al_2O_3$) is 12 mass % or more and less than 40 mass %, the composition ratio of magnesium oxide (MgO) is 5 mass % or more and less than 12 mass %, and the composition ratio of boron oxide ($B_2O_3$) is more than 0 mass % and 8 mass % or less.

In other words, in the constituent material, which originates in the above-mentioned glass raw materials, among the constituent materials of the glass-ceramics composite material according to the present embodiment, various components of raw materials are blended so that the proportion of elements corresponding to silicon oxide ($SiO_2$) is 15 mass % or more and less than 60 mass %, the proportion of elements corresponding to aluminum oxide ($Al_2O_3$) is 12 mass % or more and less than 40 mass %, the proportion of elements corresponding to magnesium oxide (MgO) is 5 mass % or more and less than 12 mass %, and the proportion of elements corresponding to boron oxide ($B_2O_3$) is more than 0 mass % and 8 mass % or less. Thereby, in the glass-ceramics composite material according to the present embodiment, even though boron oxide ($B_2O_3$) is blended as a flux of the glass phase, a decrease in moisture resistance can be suppressed by making a crystal phase containing boron (B) (for example, $Al_4B_2O_9$) precipitate at the time of firing of the glass-ceramics composite material.

In addition, when the composition ratio of silicon oxide ($SiO_2$) to the total amount of glass raw materials (namely, the proportion of the element equivalent to silicon oxide ($SiO_2$) in the constituent material, which originates in the above-mentioned glass raw materials, among the constituent materials of the glass-ceramics composite material according to the present embodiment) is less than 15 mass % or 60 mass % or more, it is not desirable since vitrification becomes difficult to produce phase-separation of glass and/or to increase a crystal component other than glass phase, and it becomes difficult to sufficiently densify the mixture of the crystal phase which consists of aluminum nitride (AlN) and the glass phase by firing. In addition, in the present specification, for example, "densification" means that water absorption rate becomes small by reduction of the gap in a glass-ceramics composite material, etc. In addition, when the water absorption rate is high, the reliability of the glass ceramic composite material will fall.

Moreover, when the composition ratio of aluminum oxide ($Al_2O_3$) to the total amount of glass raw materials (namely, the proportion of the element equivalent to aluminum oxide ($Al_2O_3$) in the constituent material, which originates in the above-mentioned glass raw materials, among the constituent materials of the glass-ceramics composite material according to the present embodiment) is less than 12 mass %, it is not desirable since it becomes difficult to make crystal phase containing boron (B) as mentioned above precipitate and, as a result, a possibility that it may become difficult to suppress a decrease in moisture resistance increases. On the contrary, when the composition ratio of aluminum oxide ($Al_2O_3$) to the total amount of glass raw materials is more than 40 mass %, it is not desirable since phase-separation of glass arises and/or a crystal component other than glass phase increases, and it becomes difficult to sufficiently densify the mixture of the crystal phase which consists of aluminum nitride (AlN) and the glass phase by firing.

Further, when the composition ratio of magnesium oxide (MgO) to the total amount of glass raw materials (namely, the proportion of the element equivalent to magnesium oxide (MgO) in the constituent material, which originates in the above-mentioned glass raw materials, among the constituent materials of the glass-ceramics composite material according to the present embodiment) is less than 5 mass %, it is not desirable since a possibility that the reaction of the crystal phase which consists of aluminum nitride (AlN) and the glass phase may occur increases. When the reaction occurs, the crystal phase consisting of aluminum nitride (AlN) which has very high thermal conductivity (about 170 to 200 W/m·° C.) is consumed, and crystal phase which has low thermal conductivity is produced. As a result, even though the crystal phase consisting of aluminum nitride (AlN) which has very high thermal conductivity is added, the effect on sufficiently raising the thermal conductivity of a glass-ceramics composite material is inhibited by the reaction. On the contrary, when the composition ratio of magnesium oxide (MgO) to the total amount of glass raw materials is 12 mass % or more, it is not desirable since the amount of the boron (B) which elutes under high temperature high-humidity circumstance increases (specifically, it elutes as boric acid) and, as a result, a possibility that it may become difficult to suppress a decrease in moisture resistance increases, even if crystal phase containing boron (B) as mentioned above had precipitated.

Furthermore, when the composition ratio of boron oxide ($B_2O_3$) to the total amount of glass raw materials (namely, the proportion of the element equivalent to boron oxide ($B_2O_3$) in the constituent material, which originates in the above-mentioned glass raw materials, among the constituent materials of the glass-ceramics composite material according to the present embodiment) is 0 (zero) mass % (namely, boron oxide ($B_2O_3$) is not blended), it is not desirable since the effect on adjusting the melting behavior at the time of melting glass raw materials at high temperature in the process, in which a glass phase is produced, to improve the workability at the time of melting of the glass phase, to lower the firing temperature, or to improve the strength and thermal conductivity by the rise of the degree of densification is not acquired. On the contrary, when the composition ratio of the boron oxide ($B_2O_3$) to the total amount of glass raw materials exceeds 8 mass %, it is not desirable since the amount of the boron (B) which elutes under high temperature high-humidity circumstance increases (specifically, it elutes as boric acid) and, as a result, a possibility that it may become difficult to suppress a decrease in moisture resistance increases, even if crystal phase containing boron (B) as mentioned above had precipitated.

In addition, as mentioned above, the glass raw materials may contain some accessory components besides the above-mentioned main components, unless it becomes the hindrance of achievement of the purpose of the present invention. For example, as a flux, besides boron oxide ($B_2O_3$), alkali metal oxides (for example, lithium oxide ($Li_2O$), sodium oxide ($Na_2O$), potassium oxide ($K_2O$), etc.) may be contained. Moreover, the glass raw materials may contain a crystal nucleating agent (for example, zirconium oxide ($ZrO_2$), titanium oxide ($TiO_2$), platinum (Pt), and phosphorus pentoxide ($P_2O_5$) etc.) etc. which is added in order to promote crystallization of a glass phase, as an accessory component. Further, the glass raw materials may further contain zinc oxide (ZnO) besides the above-mentioned main components, unless it becomes the hindrance of achievement of the purpose of the present invention. For all of the accessory components, concrete compounding amount which does not lead to hindrance of achievement of the purpose of the present invention can be properly determined, for example, by a preliminary experiment, etc.

As mentioned above, in the glass-ceramics composite material according to the present embodiment, the quantity of boron oxide ($B_2O_3$) contained in the glass phase after firing is reduced by adjusting the composition of raw materials which form the glass phase included in the glass-ceramics composite material (glass raw materials) to the above-mentioned conditions to make a crystal phase containing boron (B) precipitate at the time of firing of the glass-ceramics composite material. Thereby, even though boron oxide ($B_2O_3$) is blended as a flux of the glass phase, a decrease in moisture resistance due to boron oxide ($B_2O_3$) contained in the glass phase can be suppressed.

By the way, the suitable composition ratio of crystal phase which consists of aluminum nitride (AlN) to the total amount of the glass-ceramics composite material according to the present embodiment (namely, the total amount of the glass phase and the crystal phase which consists of aluminum nitride (AlN)) can be properly determined, for example, depending on the value of thermal conductivity and degree of densification which are intended to be attained in the glass-ceramics composite material, etc. However, typically, in the glass-ceramics composite material according to the present embodiment, it is desirable that the composition ratio of the crystal phase which consists of aluminum nitride (AlN) to the total amount of the glass phase and the crystal phase which consists of aluminum nitride (AlN) is 20 mass % or more and 60 mass % or less.

Therefore, the second embodiment of the present invention is, the glass-ceramics composite material according to the above-mentioned first embodiment of the present invention, wherein:

the composition ratio of said crystal phase is 20 mass % or more and 60 mass % or less to the total amount of said glass phase and said crystal phase.

As mentioned above, in the glass-ceramics composite material according to the present embodiment, the composition ratio of said crystal phase is 20 mass % or more and 60 mass % or less to the total amount of said glass phase and said crystal phase. Thereby, in the glass-ceramics composite material according to the present embodiment, the effect on the improvement of thermal conductivity by the crystal phase which consists of aluminum nitride (AlN) is sufficiently demonstrated, and the mixture of the crystal phase which consist of aluminum nitride (AlN) and the glass phase can be sufficiently densified by firing.

Namely, when the composition ratio of the crystal phase which consists of aluminum nitride (AlN) to the total amount of the crystal phase which consist of aluminum nitride (AlN) and the glass phase is less than 20 mass %, it is not desirable since the effect on the improvement of thermal conductivity by addition of the crystal phase which consists of aluminum nitride (AlN) is not sufficiently demonstrated. On the contrary, when the composition ratio of the crystal phase which consists of aluminum nitride (AlN) exceeds 60 mass %, it is not desirable since it becomes impossible for the mixture of the crystal phase which consists of aluminum nitride (AlN) and the glass phase to be sufficiently densified by firing.

As mentioned above, in the glass-ceramics composite material according to the present embodiment, the composition ratio of the crystal phase which consists of aluminum nitride (AlN) to the total amount of the crystal phase which consist of aluminum nitride (AlN) and the glass phase meets the above-mentioned conditions and, thereby, a decrease in moisture resistance due to boron oxide ($B_2O_3$) contained in the glass phase can be suppressed, while sufficiently demonstrating the intrinsic effect on the improvement of thermal conductivity by addition of the crystal phase which consists of aluminum nitride (AlN).

Hereinafter, the configuration and characteristic of the glass-ceramics composite materials according to some embodiments of the present invention, etc. will be explained in more detail. However, the explanation described below is aimed at just exemplification, and the scope of the present invention should not be interpreted as to be limited to the following explanation.

Example (1) Manufacture of Samples for Evaluation

The glass-ceramics composite materials which have various compositions listed in Table 1 were prepared as samples for evaluation (specimens). Broadly, the samples for evaluation, wherein the composition ratios of all the glass raw materials fall within the range desired for a glass-ceramics composite material according to the present invention, were classified as Working Examples (E01 to E14), and the samples for evaluation, wherein the composition ratios of any of the constituent components deviates from the range desired for a glass-ceramics composite material according to the present invention, were classified as Comparative Examples (C01 to C17).

More particularly, the glass phase was generated by first blending the raw materials of the various constituent components which constitute the glass phase (glass raw materials), heat-treating the glass raw materials for 2 hours at a predetermined temperature (specifically, 1550° C.) under an air atmosphere using a crucible made of platinum to be molten, and pouring the molten glass into water to rapidly cool the same. On this occasion, the comparative example (C17) with a superfluous composition ratio of aluminum oxide ($Al_2O_3$), was difficult to be vitrified and could not produce a glass phase normally. In addition, in the present example, although magnesium carbonate ($MgCO_3$) was used as a glass raw material corresponding to magnesium oxide (MgO), the composition ratio converted into magnesium oxide (MgO) was shown in Table 1.

Next, the various glass phases obtained as mentioned above were respectively powderized through wet milling, and their particle size were adjusted. The powder of the various glass phases thus obtained were mixed with aluminum nitride (AlN) as non-oxide system compound crystal phase (filler particles) at a predetermined compounding ratio (specifically, filler particles/glass phase=40 wt %/60 wt %), and each mixture was formed into a pellet shape with a diameter of 20 mm×thickness of 5 mm by dry pressing. Then, by firing the pellets for 5 hours at a predetermined temperature (specifically 1000° C.) under a nitrogen atmosphere, the various samples for evaluation were prepared.

(2) Analysis of Samples for Evaluation

Various properties indicated below were analyzed for each of the various samples for evaluation (specimens) obtained as mentioned above.

a) Degree of Densification

As an analysis method of the degree of densification, the "red check method" which is one of the methods widely used as a method of detecting a minute defect which opens on the surface of material was adopted. In the present example, the various samples for evaluation (fired objects) were immersed in a solution containing dye, the solution adhering to the surface of the fired objects was wiped off and the solution was further removed by washing with water, etc. Thereafter, the quality of the degree of densification was judged based on whether the fired object had been dyed by the dye. As mentioned above, a sufficiently densified glass-ceramics composite material (fired object) has few gaps, and should not be easily dyed. Therefore, in the present example, it was judged that the degree of precision was poor when the fired object was dyed.

b) Existence of Precipitation of Crystal Phase Containing Boron (B)

As mentioned above, in the glass-ceramics composite material according to the present invention, by adjusting the composition of raw materials which forms a glass phase to a specific conditions to make a crystal phase containing boron (B) (for example, $Al_4B_2O_9$) precipitate at the time of firing of the glass-ceramics composite material, a decrease in moisture resistance due to boron oxide ($B_2O_3$) can be suppressed even though boron oxide ($B_2O_3$) has been blended as a flux of the glass phase.

Then, in the present example, the X ray diffraction (XRD) patterns of the section of the various samples for evaluation (fired objects) were measured and the existence of the precipitation of the crystal phase containing boron (B) was analyzed based on the existence of a diffraction peak attributed to the crystal phase containing boron (B). Namely, it can be judged that, in the fired object in which the diffraction peak is detected, the boron oxide ($B_2O_3$) blended as a flux of the glass phase is taken into the crystal phase which precipitates at the time of firing, the quantity of the boron oxide ($B_2O_3$) contained in the glass phase is reduced, and a decrease in moisture resistance due to boron oxide ($B_2O_3$) contained in the glass phase is suppressed.

c) Amount of Elution of Boron (B)

As mentioned above, when the composition of raw materials which form the glass phase has not matched the predetermined conditions, even if a crystal phase containing boron (B) has precipitated, the amount of elution of the boron (B) under high temperature and high humidity circumstance increases and, as a result, a possibility that it may become difficult to suppress a decrease in moisture resistance increases. Then, in the present example, the amount of elution of the boron (B) in the various samples for evaluation (fired objects) was measured.

As a concrete procedure, first, the various samples for evaluation (fired objects) were ground, and their particle size was adjusted to 420 to 590 micrometers. A predetermined quantity (10 g) of the powder thus obtained was weighed and moved into a crucible made of platinum containing distilled water, and the distilled water had been boiled for 60 minutes. Then, after collecting and sufficiently drying the powder, its weight was weighed, and the amount of reduction of the weight accompanying boiling was computed.

The various analysis results of the a) to c) are listed in the following Table 1, along with the compositions of respective samples for evaluation.

TABLE 1

|  | Glass Phase # | Composition (wt %) | | | | | Degree of Densification | Crystal Containing B | Elution (wt %) |
|---|---|---|---|---|---|---|---|---|---|
|  |  | $SiO_2$ | $Al_2O_3$ | MgO | $B_2O_3$ | ZnO |  |  |  |
| C01 | 01 | 56 | 39 | 3 | 2 |  | Poor (Reacted) | Exist | 0 |
| E01 | 02 | 54 | 39 | 5 | 2 |  | Good | Exist | 0 |
| E02 | 03 | 51 | 39 | 8 | 2 |  | Good | Exist | 0 |
| E03 | 04 | 48 | 39 | 11 | 2 |  | Good | Exist | 0 |
| E04 | 05 | 46 | 24 | 11 | 2 | 17 | Good | Exist | 0 |

TABLE 1-continued

| | Glass Phase # | Composition (wt %) | | | | | Degree of Densification | Crystal Containing B | Elution (wt %) |
| | | SiO$_2$ | Al$_2$O$_3$ | MgO | B$_2$O$_3$ | ZnO | | | |
|---|---|---|---|---|---|---|---|---|---|
| C02 | 06 | 44 | 26 | 28 | 2 | | Good | Exist | 0.2 |
| C03 | 07 | 59 | 11 | 11 | 2 | 17 | Good | Not Exist | 0.5 |
| C04 | 08 | 59 | 11 | 28 | 2 | | Good | Not Exist | 1.1 |
| C05 | 09 | 53 | 39 | 3 | 5 | | Poor (Reacted) | Exist | 0 |
| E05 | 10 | 51 | 39 | 5 | 5 | | Good | Exist | 0 |
| E06 | 11 | 50 | 37 | 8 | 5 | | Good | Exist | 0 |
| E07 | 12 | 48 | 36 | 11 | 5 | | Good | Exist | 0 |
| E08 | 13 | 45 | 39 | 11 | 5 | | Good | Exist | 0 |
| E09 | 14 | 45 | 25 | 11 | 5 | 14 | Good | Exist | 0 |
| C06 | 15 | 48 | 32 | 15 | 5 | | Good | Exist | 0.3 |
| C07 | 16 | 48 | 29 | 19 | 5 | | Good | Exist | 0.2 |
| C08 | 17 | 40 | 25 | 30 | 5 | | Good | Exist | 0.4 |
| C09 | 18 | 59 | 11 | 11 | 5 | 14 | Good | Not Exist | 1.7 |
| C10 | 19 | 54 | 11 | 30 | 5 | | Good | Not Exist | 1.5 |
| C11 | 20 | 50 | 39 | 3 | 8 | | Poor (Reacted) | Exist | 0 |
| E10 | 21 | 48 | 39 | 5 | 8 | | Good | Exist | 0 |
| E11 | 22 | 48 | 36 | 8 | 8 | | Good | Exist | 0 |
| E12 | 23 | 48 | 33 | 11 | 8 | | Good | Exist | 0 |
| E13 | 24 | 48 | 25 | 11 | 8 | 8 | Good | Exist | 0 |
| E14 | 25 | 48 | 25 | 11 | 8 | 11 | Good | Exist | 0 |
| C12 | 26 | 46 | 31 | 15 | 8 | | Good | Exist | 0.5 |
| C13 | 27 | 52 | 10 | 11 | 8 | 11 | Good | Not Exist | 1.8 |
| C14 | 28 | 52 | 10 | 30 | 8 | | Good | Not Exist | 2.4 |
| C15 | 29 | 48 | 36 | 5 | 11 | | Good | Exist | 0.7 |
| C16 | 30 | 46 | 32 | 11 | 11 | | Good | Exist | 0.9 |
| C17 | 31 | 45 | 45 | 5 | 5 | | Difficult to be vitrified | — | — |

(3) Evaluation of Samples for Evaluation

As shown in Table 1, in the samples for evaluation, wherein the composition ratios of all the glass raw materials fall within the range desired for a glass-ceramics composite material according to the present invention (Working Examples E01 to E14), good degree of precision was attained, and the diffraction peak attributed to the crystal phase containing boron (B) was observed, and reduction of the weight accompanying boiling in distilled water was not observed. Namely, it was confirmed that a glass-ceramics composite material suitable for a low-temperature firing use, which has high moisture resistance and thermal conductivity, can be provided by keeping the composition ratios of all the glass raw materials within the range desired for a glass-ceramics composite material according to the present invention.

On the other hand, in the samples for evaluation, wherein the composition ratio of magnesium oxide (MgO) in the glass phase is too small (Comparative Examples C01, C05, and C11), although the diffraction peak attributed to the crystal phase containing boron (B) was observed, due to an unintended reaction aluminum nitride (AlN) as non-oxide system compound crystal phase (filler particles) and the glass phase, the degree of densification of the resulting glass-ceramics composite material could not be sufficiently raised. Therefore, in these samples for evaluation (Comparative Example C01, C05, and C11), there is a high possibility that it may be difficult to attain sufficient thermal conductivity.

Moreover, regarding the samples for evaluation wherein the composition ratio of aluminum oxide (Al$_2$O$_3$) in the glass phase is too small (Comparative Examples C03, C04, C09, C10, C13, and C14), in the samples for evaluation wherein the composition ratio of magnesium oxide (MgO) falls within the desirable range (Comparative Examples C03, C09, and C13), as well as in the samples for evaluation wherein the composition ratio of magnesium oxide (MgO) is superfluous (Comparative Examples C04, C10, and C14), no diffraction peak attributed to the crystal phase containing boron (B) was observed, and reduction of the weight accompanying boiling in distilled water was observed. Therefore, in these samples for evaluation (Comparative Example C03, C04, C09, C10, C13, and C14), there is a high possibility that the quantity of the boron oxide (B$_2$O$_3$) contained in a glass phase may be not reduced and, as a result, moisture resistance may fall due to the boron oxide (B$_2$O$_3$) which is contained in the glass phase.

Further, in samples for evaluation wherein, although the composition ratio of aluminum oxide (Al$_2$O$_3$) in the glass phase falls within the desirable range, the composition ratio of magnesium oxide (MgO) in the glass phase is superfluous (Comparative Example C02, C06 to C08, and C12), as well as in samples for evaluation wherein the composition ratio of boron oxide (B$_2$O$_3$) in the glass phase is superfluous (Comparative Example C15 and C16), although a diffraction peak attributed to the crystal phase containing boron (B) was observed, reduction of the weight accompanying boiling in distilled water was observed. Therefore, in these samples for evaluation (Comparative Example C02, C06 to C08, C12, C15, and C16), there is a high possibility that the boron oxide (B$_2$O$_3$) contained in the glass phase may elute under a high temperature and high humidity circumstance and, as a result, moisture resistance may fall.

Although some embodiments with certain configurations have been described for the purpose of explanation of the present invention, as mentioned above, it is not necessary to say that the scope of the present invention is not limited to these exemplary embodiments and modification can be properly added within the range of the matter described in the claims and specification.

The invention claimed is:
1. A glass-ceramics composite material obtained by firing,
a glass phase obtained from glass raw materials that comprise silicon oxide (SiO$_2$), aluminum oxide (Al$_2$O$_3$), magnesium oxide (MgO), and boron oxide (B$_2$O$_3$), and
a crystal phase that consists of aluminum nitride (AlN), wherein:
based on the total amount of said glass raw materials, the composition ratio of silicon oxide ($SiO_2$) is 15 mass % or more and 57 mass % or less, the composition ratio of aluminum oxide ($Al_2O_3$) is more than 15 mass % and less than 40 mass %, the composition ratio of magnesium oxide (MgO) is more than 6 mass % and less than 12 mass %, and the composition ratio of boron oxide ($B_2O_3$) is more than 0 mass % and less than 8 mass %.

2. The glass-ceramics composite material according to claim 1, wherein:

the composition ratio of said crystal phase is 20 mass % or more and 60 mass % or less to the total amount of said glass phase and said crystal phase.

3. The glass-ceramics composite material according to claim 1, wherein based on the total amount of said glass raw materials, the composition ratio of silicon oxide ($SiO_2$) is 15 mass % or more and 48 mass % or less, the composition ratio of aluminum oxide ($Al_2O_3$) is more than 15 mass % and less than 40 mass %, the composition ratio of magnesium oxide (MgO) is more than 6 mass % and less than 12 mass %, and the composition ratio of boron oxide ($B_2O_3$) is more than 0 mass % and less than 8 mass %.

4. The glass-ceramics composite material according to claim 3, wherein the composition ratio of said crystal phase is 20 mass % or more and 60 mass % or less to the total amount of said glass phase and said crystal phase.

5. The glass-ceramics composite material according to claim 1, comprising $Al_4B_2O_9$ as a boron-containing precipitate.

6. The glass-ceramics composite material according to claim 2, comprising $Al_4B_2O_9$ as a boron-containing precipitate.

7. The glass-ceramics composite material according to claim 3, comprising $Al_4B_2O_9$ as a boron-containing precipitate.

* * * * *